US007341367B2

(12) United States Patent
Tsukamoto et al.

(10) Patent No.: US 7,341,367 B2
(45) Date of Patent: Mar. 11, 2008

(54) VEHICLE HEADLAMP

(75) Inventors: Michio Tsukamoto, Shizuoka (JP); Hiroshi Kawashima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/492,807

(22) Filed: Jul. 26, 2006

(65) Prior Publication Data

US 2007/0025116 A1 Feb. 1, 2007

(30) Foreign Application Priority Data

Jul. 27, 2005 (JP) .......................... P.2005-217915

(51) Int. Cl.
*B60Q 1/04* (2006.01)

(52) U.S. Cl. ...................................... 362/538; 362/539

(58) Field of Classification Search ................ 362/538, 362/539

See application file for complete search history.

(56) References Cited

U.S. PATENT DOCUMENTS 1,363,073 A * 12/1920 Wood ......................... 362/538
2,215,203 A * 9/1940 Young ........................ 362/538
5,307,247 A * 4/1994 Cejnek ....................... 362/539
6,161,952 A * 12/2000 Schuster et al. ............ 362/539
6,776,513 B2 * 8/2004 Albou ......................... 362/507
7,059,752 B2 * 6/2006 Yagi et al. .................. 362/538
7,237,934 B2 * 7/2007 Kagiyama ................... 362/538
2003/0174509 A1 * 9/2003 Futami ....................... 362/517

FOREIGN PATENT DOCUMENTS

JP 2003-016813 A 1/2003

* cited by examiner

*Primary Examiner*—Hargobind S. Sawhney
(74) *Attorney, Agent, or Firm*—Sughrue Mion, PLLC

(57) ABSTRACT

A vehicle headlamp is provided with a projection lens disposed on an optical axis extending in a longitudinal direction of the vehicle; a light source disposed at a rear side of a rear side focal point of the projection lens; a reflector which reflects a light emitted from the light source to a front direction toward the optical axis; and an auxiliary lens disposed in front of a peripheral portion of the projection lens. The auxiliary lens controls a deflection of a light reflected from the reflector and transmitted through the projection lens.

13 Claims, 14 Drawing Sheets

VEHICLE HEADLAMP

The present invention claims foreign priority from Japanese patent application no. 2005-217915, filed on Jul. 27, 2005, the content of which is incorporated herein by reference.

BACKGROUND OF THE INVENTION

1. Field of the Invention

The present invention relates to a so-called projector-type vehicle headlamp.

2. Description of the Related Art

In general, the projector-type vehicle headlamp is configured so that a projection lens is disposed on an optical axis extending in the longitudinal direction of a vehicle, a light source is disposed on a rear side of a rear side focal point of the projection lens, and light from the light source is reflected by a reflector toward the optical axis.

In this respect, JP-A-2003-16813 discloses a projector-type vehicle headlamp having a pair of cylindrical lenses in which the cylindrical lenses are respectively disposed at the left and right sides of the projection lens and a part of the reflection surface of the reflector is formed as a reflection surface for reflecting light toward the respective cylindrical lenses.

In the normal projector-type vehicle headlamp, a distribution light pattern formed by irradiated light thereof is produced as an inverted projection image of an light source image which is formed on the rear side focal point surface of a projection lens by light emitted from a light source and reflected by a reflector. Thus, it is not easy to enlarge the size of the distribution light pattern or to increase the luminance at the center portion of the distribution light pattern.

In this respect, when the vehicle head lamp is configured so that a pair of cylindrical lenses are respectively disposed at the left and right sides of the projection lens, as disclosed in JP-A-2003-16813, it becomes possible to set the shape of the distribution light pattern so that it has large left and right diffusion angles. Further, the luminance at the center portion of the distribution light pattern can be increased by disposing a suitable auxiliary lens in place of these cylindrical lenses.

However, in this case, since it is necessary that the part of the reflection surface of the reflector is formed as a reflection surface for reflecting light toward the respective cylindrical lenses (or another auxiliary lens), there arises a problem that the configuration or the lamp is complicated. Further, the distribution light pattern formed by the irradiation light from the vehicle headlamp is configured as a composite distribution light pattern, which is the composition of a basic distribution light pattern formed by light irradiated in the forward direction via the projection lens and auxiliary distribution light patterns formed by light in the forward direction via the respective cylindrical lenses (or another auxiliary lens). In this case, since the basic distribution light pattern and the auxiliary distribution light patterns are formed by independent optical systems, respectively, there also arises a problem that the light distribution likely becomes non-uniform.

SUMMARY OF THE INVENTION

According to one aspect of the present invention, a vehicle headlamp includes a projection lens disposed on an optical axis extending in a longitudinal direction of the vehicle; a light source disposed at a rear side of a rear side focal point of the projection lens; a reflector which reflects a light emitted from the light source to a front direction toward the optical axis; and an auxiliary lens disposed in front of a peripheral portion of the projection lens, wherein the auxiliary lens controls a deflection of a light reflected from the reflector and transmitted through the projection lens.

The “light source” is not limited to particular kind. For example, as the light source, it is possible to employ a light emitting portion of a discharge bulb or a halogen bulb, or a light emitting chip of a light emitting device, such as a light emitting diode. An actual position of the light source is not limited to a particular position as long as the “light source” is disposed on the rear side of the rear side focal point of the projection lens. For example, the light source may be disposed on the optical axis or a position away from the optical axis.

The actual configuration of the “auxiliary lens” is not limited to a particular configuration as long as the auxiliary lens is disposed near to the front side of the peripheral portion of the projection lens and configured so as to deflect the reflection light reflected from the reflector and transmitted through the projection lens. Further, the “auxiliary lens” may be formed in an annular shape along the entire periphery of the projection lens or formed at the part of the projection lens in the peripheral direction thereof.

According to another aspect of the present invention, a vehicle headlamp includes a projection lens disposed on an optical axis extending in a longitudinal direction of the vehicle; a light source disposed at a rear side of a rear side focal point of the projection lens; a reflector which reflects a light emitted from the light source to a front direction toward the optical axis, and a transparent member having an opening portion formed in a region around the optical axis. The transparent member includes an auxiliary lens disposed in front of a peripheral portion of the projection lens. The auxiliary lens controls a deflection of a light reflected from the reflector and transmitted through the projection lens.

Further, a front face of the transparent member may have a surface shape that is asymmetrical with respect to a predetermined plane including the optical axis. In this case, the “predetermined plane” may be a horizontal plane, a vertical plane or a slanted plane so long as the predetermined plane includes the optical axis.

BRIEF DESCRIPTION OF THE DRAWINGS

The advantages, nature, and various additional features of the invention will appear more fully upon consideration of the exemplary embodiments. The exemplary embodiments are set forth in the following drawings.

DESCRIPTION OF THE EXEMPLARY EMBODIMENTS

Hereinafter, exemplary embodiments of the invention will be explained with reference to the drawings, the following exemplary embodiments do not limit the scope of the invention.

First, the first exemplary embodiment of the invention will be explained.

Figure 1:
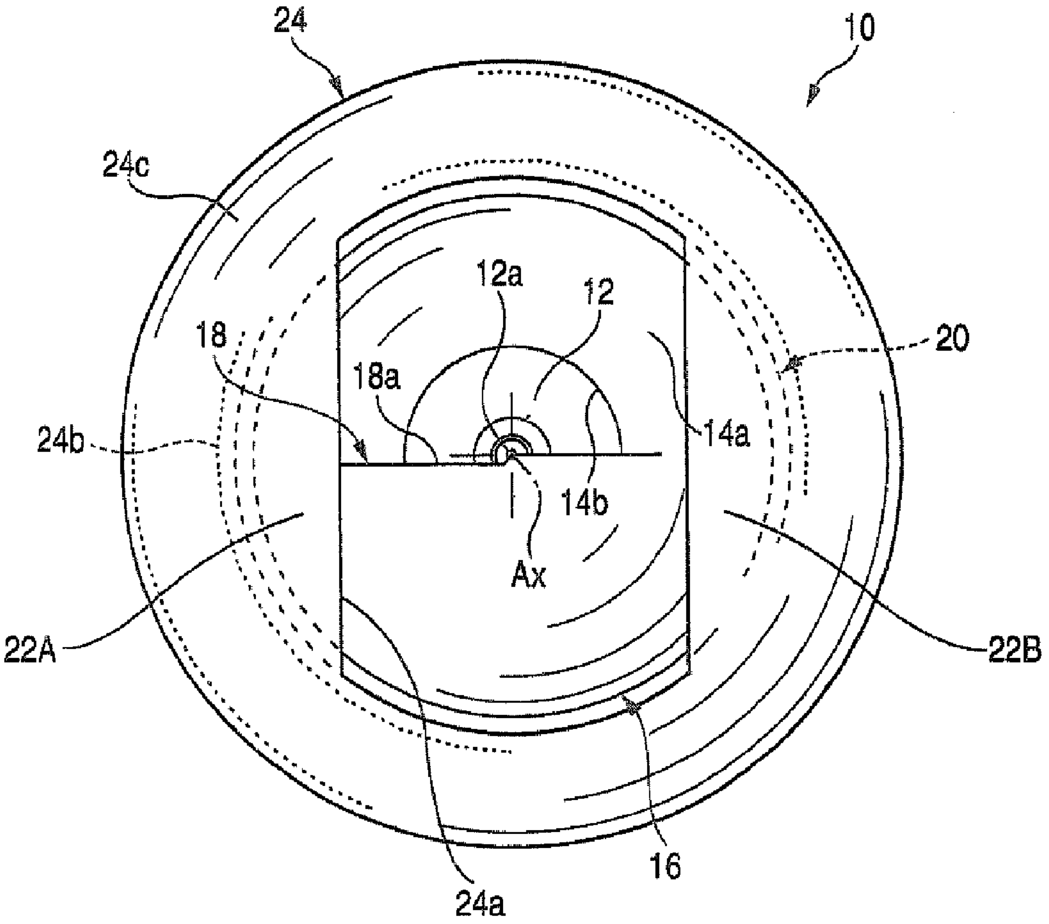
FIG. 1 is a front view showing a vehicle headlamp according to the first exemplary embodiment of the invention.
Figure 2:
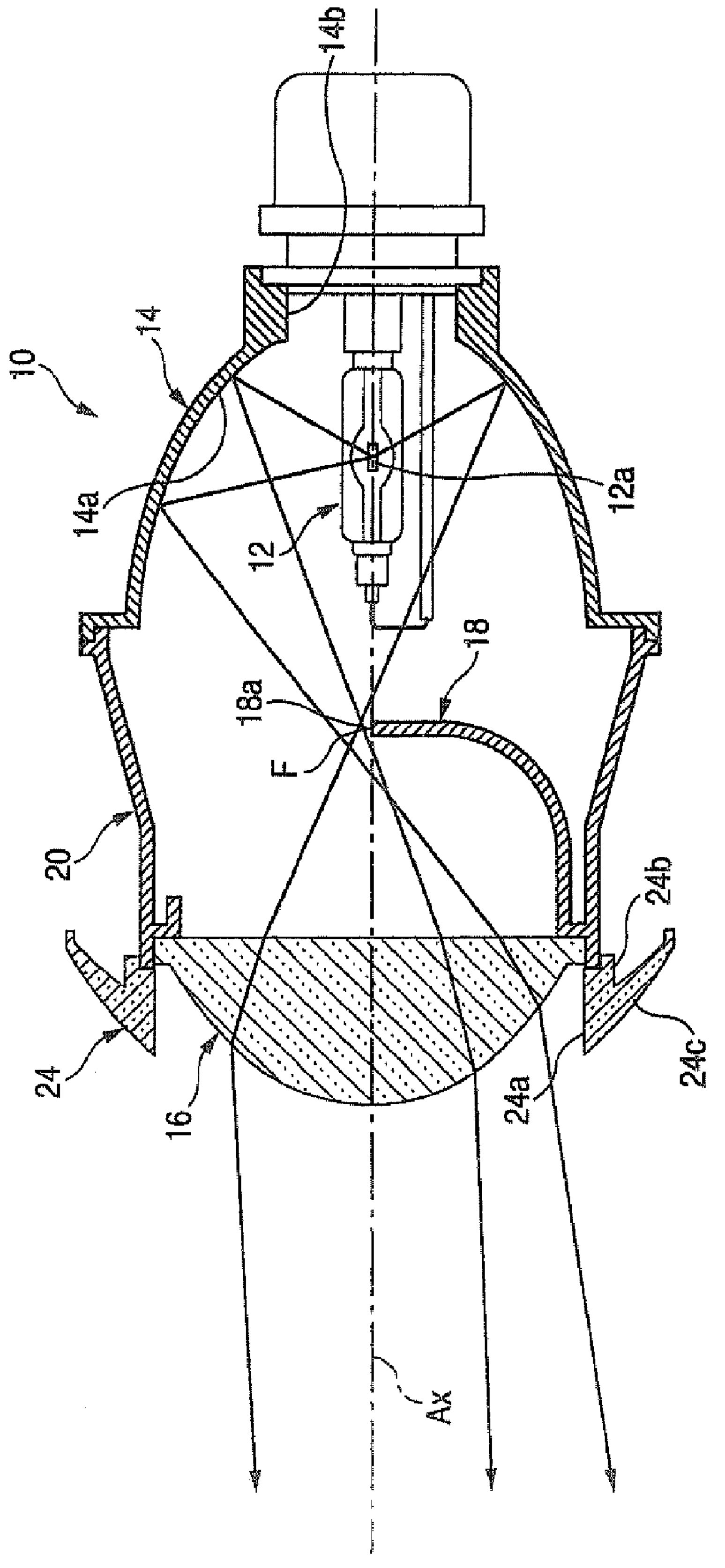
FIG. 2 is a side sectional view showing the vehicle headlamp.
Figure 3:
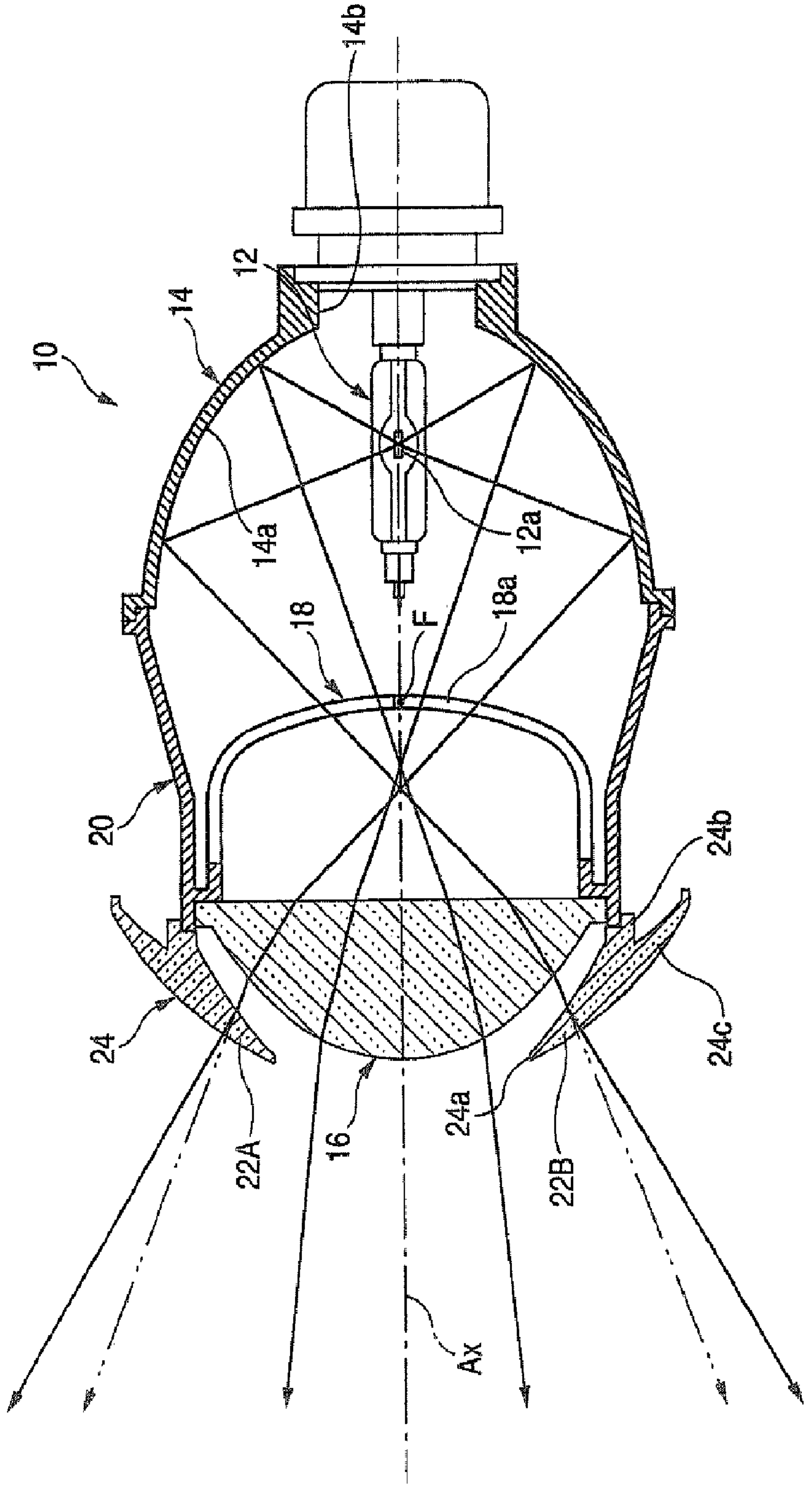
FIG. 3 is a plan sectional view showing the vehicle headlamp.

FIG. 1 is a front view of a headlamp 10 for a vehicle according to the first exemplary embodiment, and FIGS. 2 and 3 are side sectional view and a plan sectional view thereof, respectively.

As shown in these figures, the vehicle headlamp 10 according to the first exemplary embodiment is configured as a projector-type lamp unit which irradiates light for forming a distribution light pattern for a low beam and is used in a state of being incorporated within a not-shown lamp body, etc.

The vehicle headlamp 10 includes a bulb 12, a reflector 14, a projection lens 16, a shade 18, a holder 20, and a transparent member 24 having a pair of auxiliary lenses 22A, 22B. The vehicle headlamp 10 also has an optical axis Ax extending in the longitudinal direction of a vehicle. The vehicle headlamp 10 is disposed in a state in which, when aiming adjustment has been completed, the optical axis Ax thereof extends in downward by about 0.5 to 0.6 degree with respect to the longitudinal direction of a vehicle.

The projection lens 16 is formed by a plano-convex aspherical lens having a front side face of a convex shape and a rear side face of a planer shape and is disposed on the optical axis Ax. The projection lens 16 is arranged to project an image on the face of the projection lens, which has the rear side focal point F, onto a vertical phantom screen disposed forward of the lamp as an inverted image.

The light source bulb 12 is a discharge bulb, such as a metal halide lamp, and has a discharge light emitting portion as a light source 12*a*. The light source bulb 12 is inserted into and attached to the rear top opening portion 14*b* of the reflector 14. The light source 12*a* is configured as a linear light source extending along the optical axis Ax.

The reflector 14 includes a reflecting surface 14*a* which reflects light from the light source bulb 12 in the forward direction toward the optical axis Ax. The sectional shape of the reflecting surface 14*a* along a plane including the optical axis Ax is set to an almost elliptical shape in a manner such that the eccentricity of the shape becomes gradually larger from the vertical section toward the horizontal section. Thus, the light emitted from the light source 12*a* and reflected by the reflecting surface 14*a* within the vertical sectional plane almost converges near the rear side focal point F (FIG. 2), while the converging position of the reflected light from the reflecting surface in the horizontal sectional plane is shifted toward the forward side of the rear side focal point F (FIG. 3). In this case, a region of the reflecting surface 14*a* located at the lower side of the optical axis Ax is configured to deflect and reflect the light from the light source 12*a* toward the optical axis Ax to a larger extent than a region of the reflecting surface located at the upper side of the optical axis Ax. As a result, the reflection light from the reflecting surface 14*a* is prevented from being shielded by the shade 18 more than is required.

The holder 20 is a cylindrical member disposed between the projection lens 16 and the reflector 14. The holder 20 fixedly supports the projection lens 16 at the front end portion thereof and is fixedly supported by the reflector 14 at the rear end portion thereof.

The shade 18 is integrally formed with the holder 20 at the almost lower half portion within the holder and extends from the front end portion of the holder to the rear side. The shade 18 is formed so that the upper end edge 18*a* thereof passes the rear side focal point F of the projection lens 16, thereby shielding a part of the reflection light from the reflecting surface 14*a* of the reflector 14 in order to remove most of the upward light irradiated in the forward direction from the projection lens 16. In this case, the upper end edge 18*a* of the shade 18 is formed so as to extend in an almost arc shape in the horizontal direction along the rear side focal point surface of the projection lens 16 and to have different heights in the vertical direction between the left and right sides thereof.

The transparent member 24 has a circular outer shape that is larger than the projection lens 16 when seen from the front side of the lamp, and the front face of the transparent member is formed in an almost spherical shape. An area of the transparent member 24 near the optical axis Ax is formed as an opening portion 24*a*. The opening portion 24*a* is configured at each of its upper and lower side portions by an arc with almost the same diameter as that of the outermost diameter of the projection lens 16 and is further configured at each of its left and right side portions by a vertical line. Therefore, the opening portion has an opening with an almost oval shape. A pair of bow-shaped regions at the left and right sides of the opening 24*a* constitute the pair of auxiliary lenses 22A, 22B.

The auxiliary lenses 22A, 22B of the pair are respectively disposed at the left and right sides of the optical axis Ax near the front side of the peripheral portion of the projection lens 16. The pair of auxiliary lenses 22A, 22B deflect the reflection light reflected from the reflector 14 and passed through the projection lens 16. In this case, each of the auxiliary lenses 22A, 22B has a configuration of a convex meniscus lens in its horizontal section such that the thickness thereof increases in accordance with a distance away from the optical axis Ax. Thus, the reflection light reflected from the reflector 14 and passed through the projection lens 16 can be deflected away from the optical axis Ax in the horizontal direction.

The transparent member 24 includes a flange portion 24*b* of an annular shape at a portion surrounding the opening portion 24*a* and the pair of auxiliary lenses 22A, 22B. The transparent member is fixedly supported by the holder 20 in a manner that the rear end face of the flange portion 24*b* is abutted against the front end face of the holder 20. The annular portion of the transparent member 24 that is located at the outer periphery side of the flange portion 24*b* is configured as a dummy lens portion 24*c* with a shape of a convex meniscus lens.

As shown in FIG. 3, of the reflection light reflected from the reflector 14 and passed through the projection lens 16, the light irradiated from the peripheral portions at the left and right side portions of the projection lens 16 enters into the auxiliary lenses 22A, 22B and is deflected and irradiated in the direction away from the optical axis Ax in the horizontal direction due to the lens function of the auxiliary lenses 22A, 22B, respectively. On the other hand, the light irradiated from the other portions of the projection lens 16 is directed in the forward direction since this light does not enter into the auxiliary lenses 22A, 22B. In this case, although the light irradiated from the peripheral portions at the left and right side portions of the projection lens 16 is originally light directed away from the optical axis Ax in the horizontal direction as shown by the two-dot chain lines in FIG. 3, this light is directed further away from the optical axis Ax in the horizontal direction due to the effect of the respective auxiliary lenses 22A, 22B.

Figure 4:
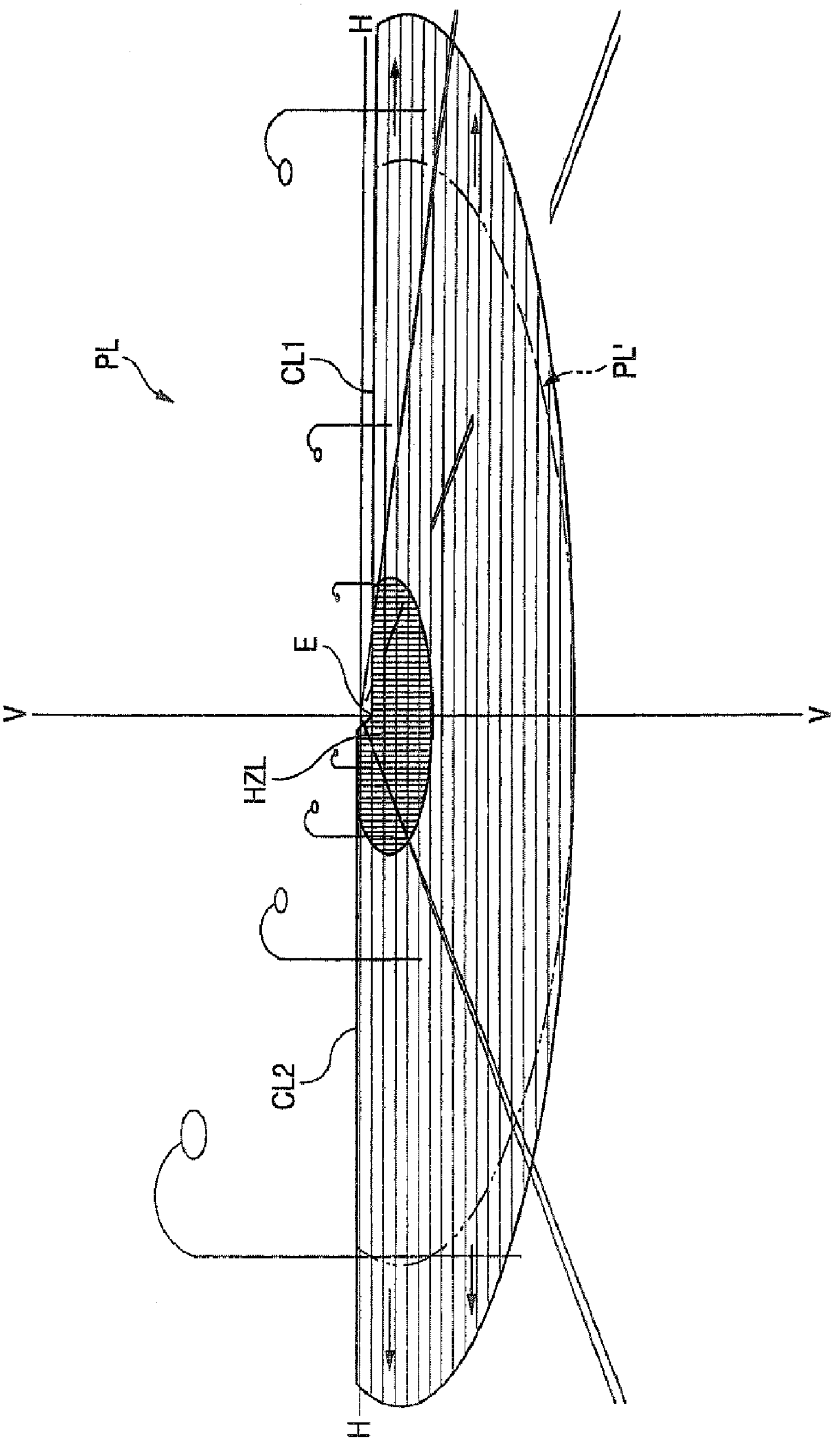
FIG. 4 is a diagram perspectively showing a low beam distribution light pattern formed, by the light irradiated in the forward direction from the vehicle headlamp, on a phantom vertical screen disposed at a position 25 m forward from the lamp.

FIG. 4 is a diagram perspectively showing a low beam distribution light pattern PL formed, by the light irradiated in the forward direction from the vehicle headlamp 10 according to the exemplary embodiment, on a phantom vertical screen disposed at a position 25 m forward from the lamp.

The low beam distribution light pattern PL is a low beam distribution light pattern for the left distribution light and has cutoff lines CL1,CL2 having different left and right side heights in the vertical direction at the upper end edge thereof, respectively. The cutoff lines CL1, CL2 extend respectively in the horizontal direction with the different left and right side heights with respect to a V-V line, which serves as a border line that crosses with a cross point H-V as the focal point in the front direction of the lamp and extends in the vertical direction. The opposite lane side portion on the right side with respect to the line V-V is formed as the lower cutoff line CL1, whilst the own lane side portion on the left side with respect to the line V-V is formed as the higher cutoff line CL2, which rises in a step manner via a slanted portion from the lower cutoff line CL1.

In the low beam distribution light pattern PL, an elbow point E that is a cross point between the lower cutoff line CL1 and the V-V line is located downward by about 0.5 to 0.6 degrees with respect to the line H-V. This is because the optical axis Ax extends in the downward direction by about 0.5 to 0.6 degrees with respect to the longitudinal direction of the vehicle. In this low beam distribution light pattern PL, a hot zone HZL as a high luminance area is formed so as to surround the elbow point E.

The low beam distribution light pattern PL is formed as the inverted projection image of a light source image formed on the rear side focal plane (that is, a focal plane including the rear side focal point F) of the projection lens 16 by the light emitted from the light source 12*a* and reflected by the reflector 14. The cutoff lines CL1, CL2 are formed as the inverted projection image of the upper end edge 18*a* of the shade 18.

The low beam distribution light pattern PL is a distribution light pattern which spreads in the left and right directions with a large diffusion angle. This is because the auxiliary lenses 22A, 22B are disposed near the front portions at the peripheries of the left and right ends of the projection lens 16, respectively.

That is, if the pair of the auxiliary lenses 22A, 22B is not disposed, the low beam distribution light pattern PL will be a low beam distribution light pattern PL' which has a slightly smaller left and right diffusion angle, as shown by a two-dot chain line in FIG. 4. Due to the lens functions of the pair of the auxiliary lenses 22A, 22B, since the light directed to regions near the left and right sides of the low beam distribution light pattern PL' are deflected away from the optical axis Ax in the horizontal direction, respectively, the low beam distribution light pattern PL becomes a distribution light pattern which is obtained by extending the left and right portions of the low beam distribution light pattern PL' to the left and right sides, respectively.

This matter will be explained in more detail.

Figure 5A:
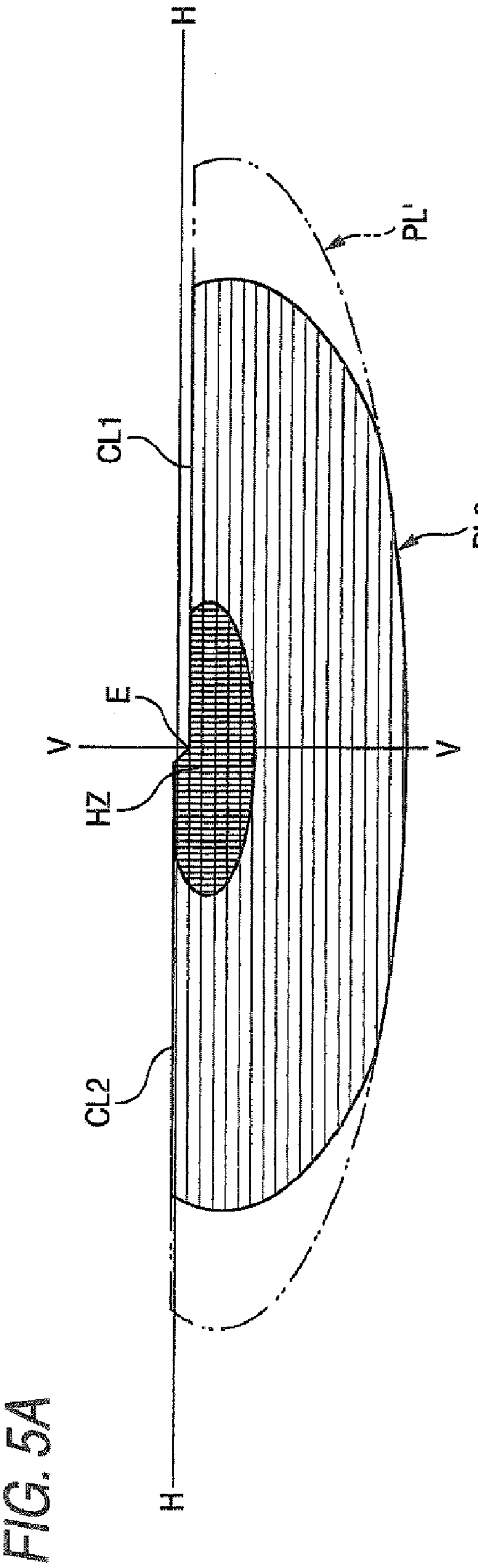
FIG. 5A is a diagram showing a basic distribution light pattern constituting the low beam distribution light pattern.
Figure 5B:
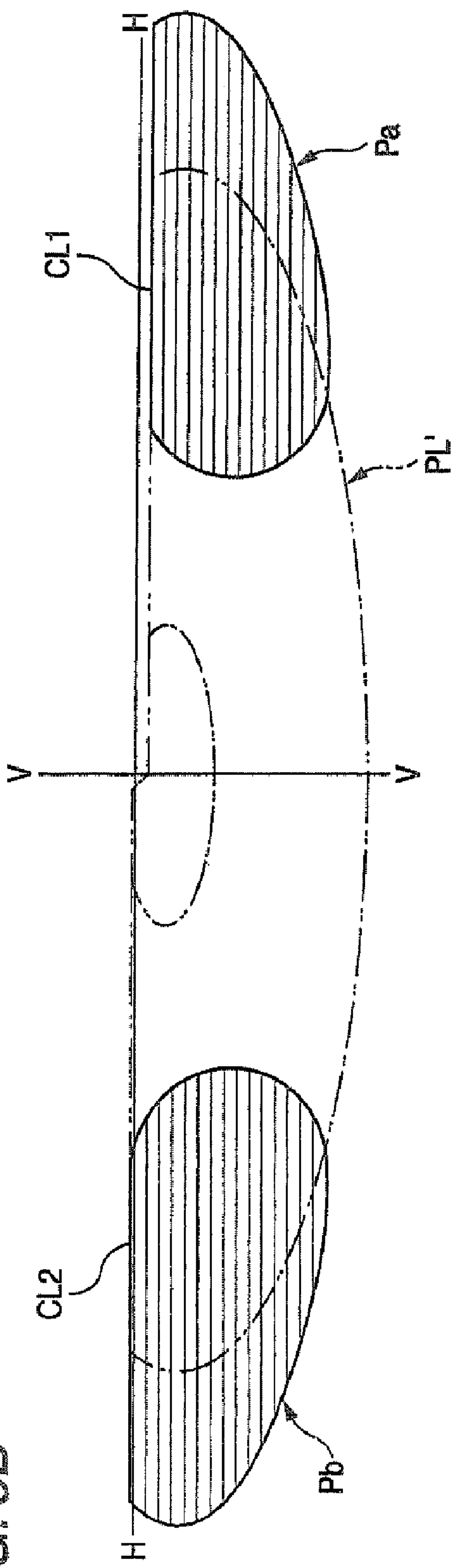
FIG. 5B is a diagram showing a pair of auxiliary distribution light patterns constituting the low beam distribution light pattern.

That is, the low beam distribution light pattern PL is formed as a composite distribution light pattern of a basic distribution light pattern PL0 shown in FIG. 5A and a pair of auxiliary distribution light patterns Pa, Pb shown in FIG. 5B.

The basic distribution light pattern PL0 is a distribution light pattern formed by the light which is irradiated from the projection lens 16 in the forward direction without entering into the auxiliary lenses 22A, 22B. The basic distribution light pattern is a distribution light pattern similar to the low beam distribution light pattern PL' in which regions near the left and right ends thereof are missing.

On the other hand, the right side auxiliary distribution light pattern Pa is a distribution light pattern formed by the light which is irradiated from the projection lens 16 in the forward direction via the right side auxiliary lens 22A. This right side auxiliary distribution light pattern is a distribution light pattern similar to the low beam distribution light pattern PL' in which a region near the right side thereof is extended in the right direction.

On the other hand, the left side auxiliary distribution light pattern Pb is a distribution light pattern formed by the light which is irradiated from the projection lens 16 in the forward direction via the left side auxiliary lens 22B. This left side auxiliary distribution light pattern is a distribution light pattern similar to the low beam distribution light pattern PL' in which a region near the left side thereof is extended in the left direction.

In this case, an amount of light deflected away from the optical axis Ax in the horizontal direction due to the auxiliary lenses 22A, 22B becomes gradually larger as the light incident position on the auxiliary lenses 22A, 22B becomes further away from the optical axis Ax. Thus, the low beam distribution light pattern PL is a distribution light pattern which is obtained by smoothly extending the left and right portions of the low beam distribution light pattern PL' to the left and right sides, respectively, and so this low beam distribution light pattern is very uniform.

As is explained in detail above, the vehicle headlamp 10 according to the exemplary embodiment is configured to reflect the light from the light source 12*a*, which is disposed on the optical axis Ax behind the rear side focal point F of the projection lens 16 disposed on the optical axis Ax extending to the longitudinal direction of the vehicle, in the forward direction by the reflector 14 toward the optical axis Ax. Since the pair of the auxiliary lenses 22A, 22B, for deflecting the light reflected from the reflector 14 and passed through the projection lens 16, are disposed near the front side of the peripheral portion of the projection lens 16, a part of the light irradiated in the forward direction through the projection lens 16 is irradiated in the forward direction through the auxiliary lenses 22A, 22B.

Thus, the low beam distribution light pattern PL formed by the irradiation light from the vehicle headlamp 10 is configured as a composite distribution light pattern which is the composition of the basic distribution light pattern PL0 formed by the light irradiated in the forward direction directly through the projection lens 16 and the auxiliary distribution light patterns Pa, Pb formed by the lights irradiated in the forward direction through the projection lens 16 and the auxiliary lenses 22A, 22B. As a result, the shape and the luminance distribution of the low beam distribution light pattern can be suitably changed due to the light deflection function of the auxiliary lenses 22A, 22B.

In this case, like the basic distribution light pattern PL0, each of the auxiliary distribution light patterns Pa, Pb is formed by utilizing the light irradiated in the forward direction through the projection lens 16. This auxiliary distribution light pattern can be formed as a distribution light pattern having almost the same nature as the basic distribution light pattern PL0. Thus, the composite, low beam distribution light pattern PL is very uniform.

Further, the vehicle headlamp 10 according to the exemplary embodiment is merely provided with the auxiliary lenses 22A, 22B which are disposed near the front side of the peripheral portion of the projection lens 16, and the remaining configuration is the same as that of a normal projector-type vehicle headlamp. Thus, the configuration of the lamp is not complicated.

In this manner, according to the exemplary embodiment, in the projector-type vehicle headlamp 10, the shape and the luminance distribution of the low beam distribution light pattern PL formed by the irradiation light can be adjusted while nonuniformity of the light distribution is suppressed. Further, this adjustment can be realized without complicating the configuration of the lamp.

Further, if the auxiliary lens is disposed at least one of the left side or right side of the optical axis, the spreading degree of the distribution light pattern in at least one of the left or right direction can be easily increased, and the center luminance thereof also can be increased easily. Since the vehicle headlamp 10 according to the exemplary embodiment is configured such that the auxiliary lenses 22A, 22B are disposed on the left and right sides of the optical axis Ax, thereby deflecting in the horizontal direction the light reflected from the reflector 14 and pass through the projection lens 16, the spreading degree of the low beam distribution light pattern PL in the left and right directions can be increased.

The auxiliary lens may be disposed near the front side of the peripheral portion of the projection lens as a single element. However, in the vehicle headlamp 10 according to the exemplary embodiment, since the auxiliary lenses 22A, 22B are configured as parts of the transparent member 24, which includes an opening 24*a* near the optical axis Ax, the auxiliary lenses 22 can be disposed with a high positional accuracy, and further the appearance of the vehicle headlamp 10 can be improved. In particular, since the projection lens 16 is configured by the plano-convex aspherical lens and so gives a strong impression to a viewer, it is difficult to harmonize the design of the projection lens with the design of the vehicle. However, since the transparent member 24 having the opening 24*a* is disposed near the front side of the projection lens 16, the strong impression of the projection lens 16 can be softened, and so it becomes easy to harmonize the design of the projection lens with the design of the vehicle.

Next, the second exemplary embodiment of the invention will be explained.

Figure 6:
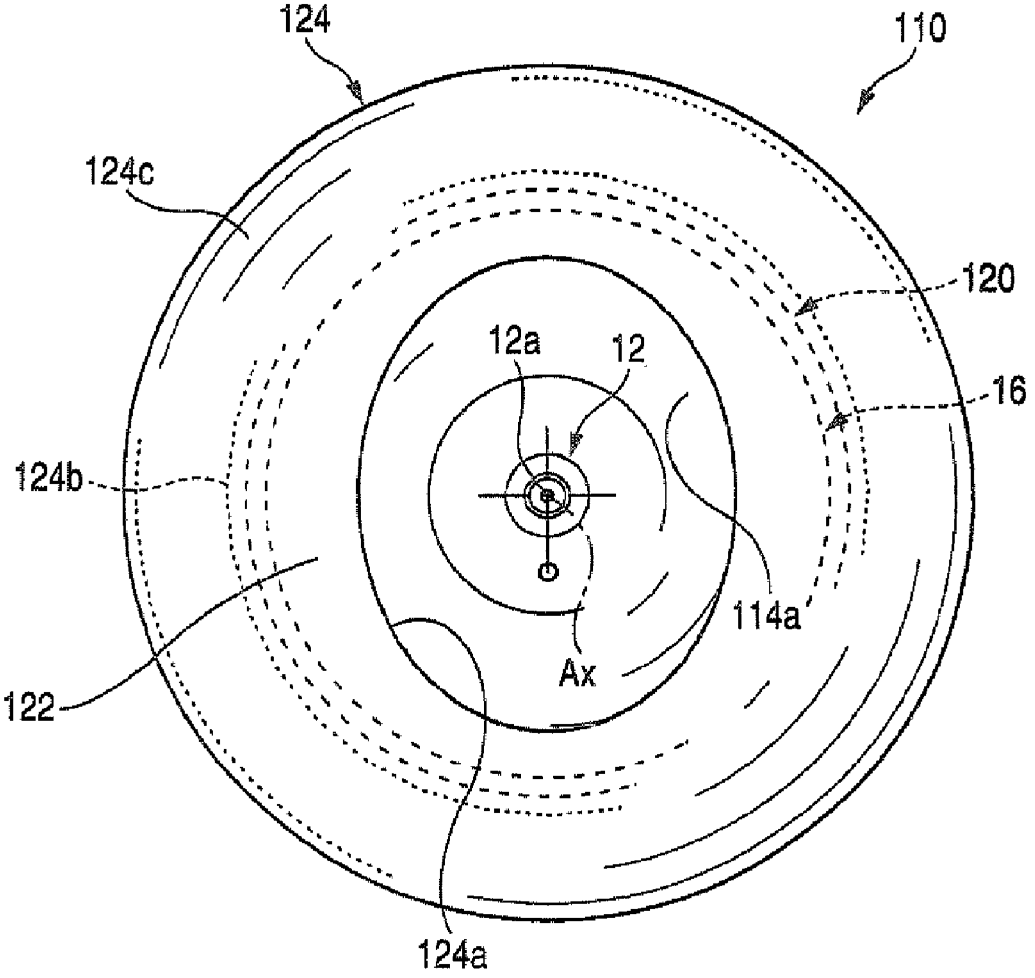
FIG. 6 is a front view showing a vehicle headlamp according to the second exemplary embodiment of the invention.
Figure 7:
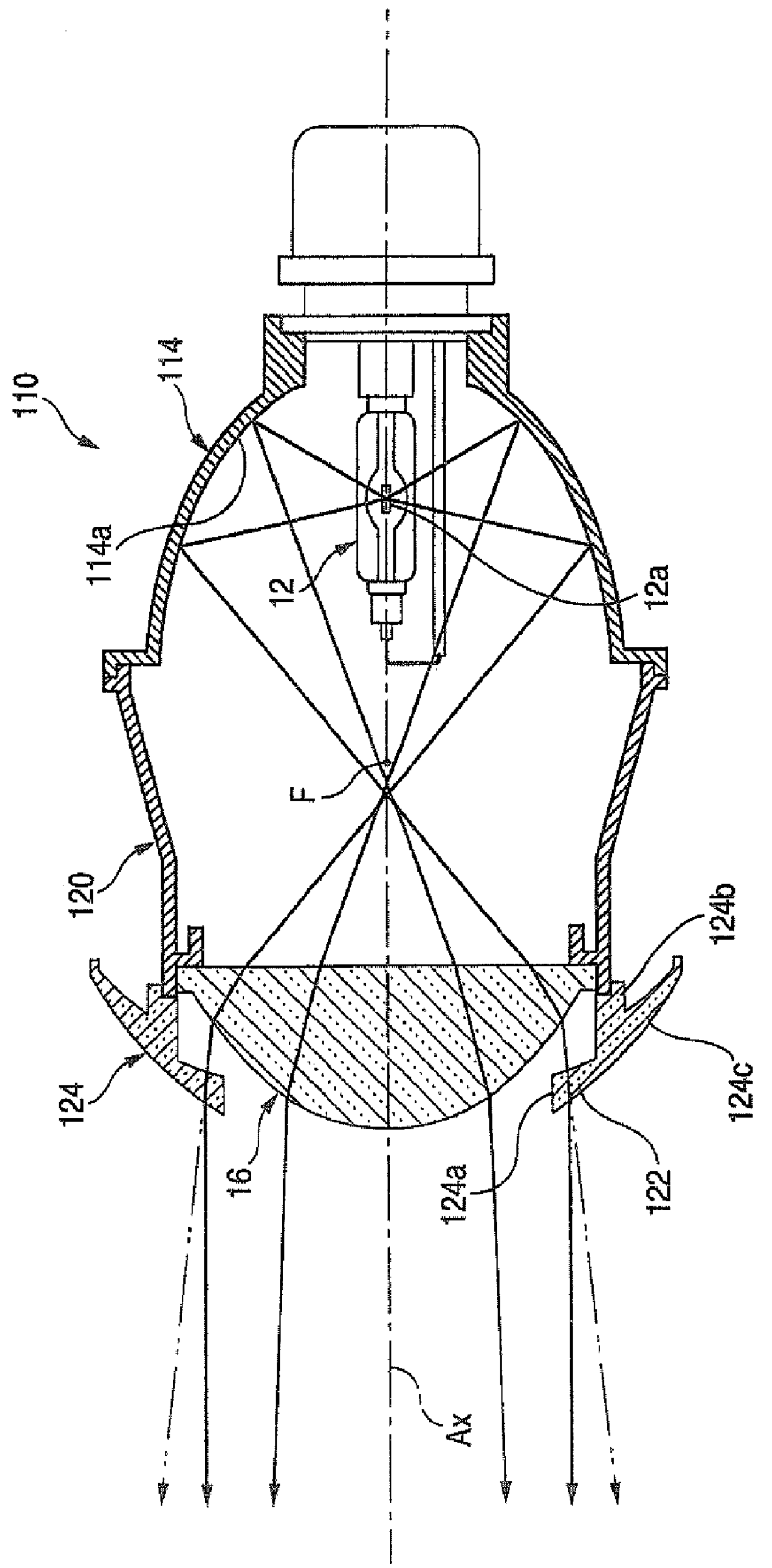
FIG. 7 is a side sectional view showing the vehicle headlamp according to the second exemplary embodiment.
Figure 8:
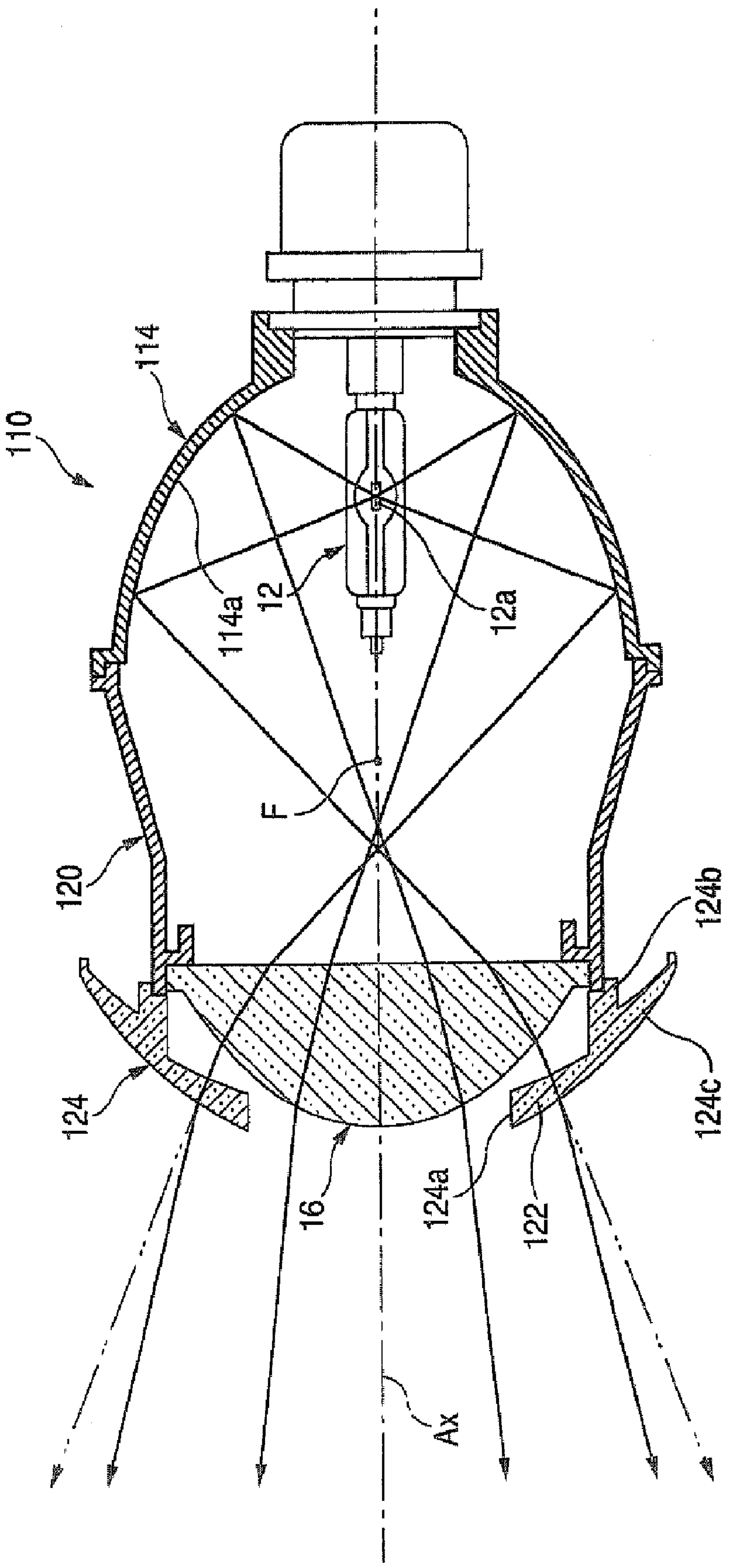
FIG. 8 is a plan sectional view showing the vehicle headlamp according to the second exemplary embodiment.

FIG. 6 is a front view showing a vehicle headlamp 110 according to this exemplary embodiment, and FIGS. 7 and 8 are a side sectional view and a plan sectional view thereof, respectively.

As shown in these figures, the vehicle headlamp 110 is configured as a projector-type lamp unit which irradiates light for forming a high beam distribution light pattern and is disposed in a state that the optical axis Ax thereof extends in the longitudinal direction of the vehicle when the aiming adjustment has been completed.

The vehicle headlamp 110 is same in its basic configuration as that of the first exemplary embodiment, the configuration of a reflector 114, a holder 120 and a transparent member 124 differ from those of the first exemplary embodiment.

That is, the reflector 114 according to this exemplary embodiment has almost the same configuration as the reflector 14 of the first exemplary embodiment but differs from that of the reflector 14 of the first exemplary embodiment in that a region of a reflecting surface 114*a* thereof beneath the optical axis Ax and a region of the reflecting surface thereof above the optical axis Ax have a symmetrical surface shape in the vertical direction with respect to the optical axis Ax.

Further, the holder 120 according to this exemplary embodiment is same in its own shape as the holder 20 of the first exemplary embodiment but does not have such a configuration in which the holder is integrally formed with the shade 18 like the holder 20 of the first exemplary embodiment.

The transparent member 124 according to the exemplary embodiment has the same configuration of a flange portion 124*b* and a dummy lens portion 124*c* thereof as the transparent member 24 of the first exemplary embodiment, but the shape of an opening portion 124*a* and the configuration of the peripheral portion thereof differ from the transparent member 24 of the first exemplary embodiment.

That is, the opening portion 124*a* of the transparent member 124 has the opening shape of an ellipse that is elongated in the vertical direction and has a center axis at the optical axis Ax. The peripheral portion of the opening portion 124*a* of the transparent member 124 is configured as an annular auxiliary lens 122. The auxiliary lens 122 is configured as a convex meniscus lens in which a thickness thereof is reduced in accordance with a distance away from the optical axis Ax. Therefore, the light reflected by the reflector 114 and passed through the lens 116 is deflected toward the optical axis Ax. In this case, the auxiliary lens 122 is set so that the refracting power thereof increases gradually from the horizontal section toward the vertical section.

Figure 9:
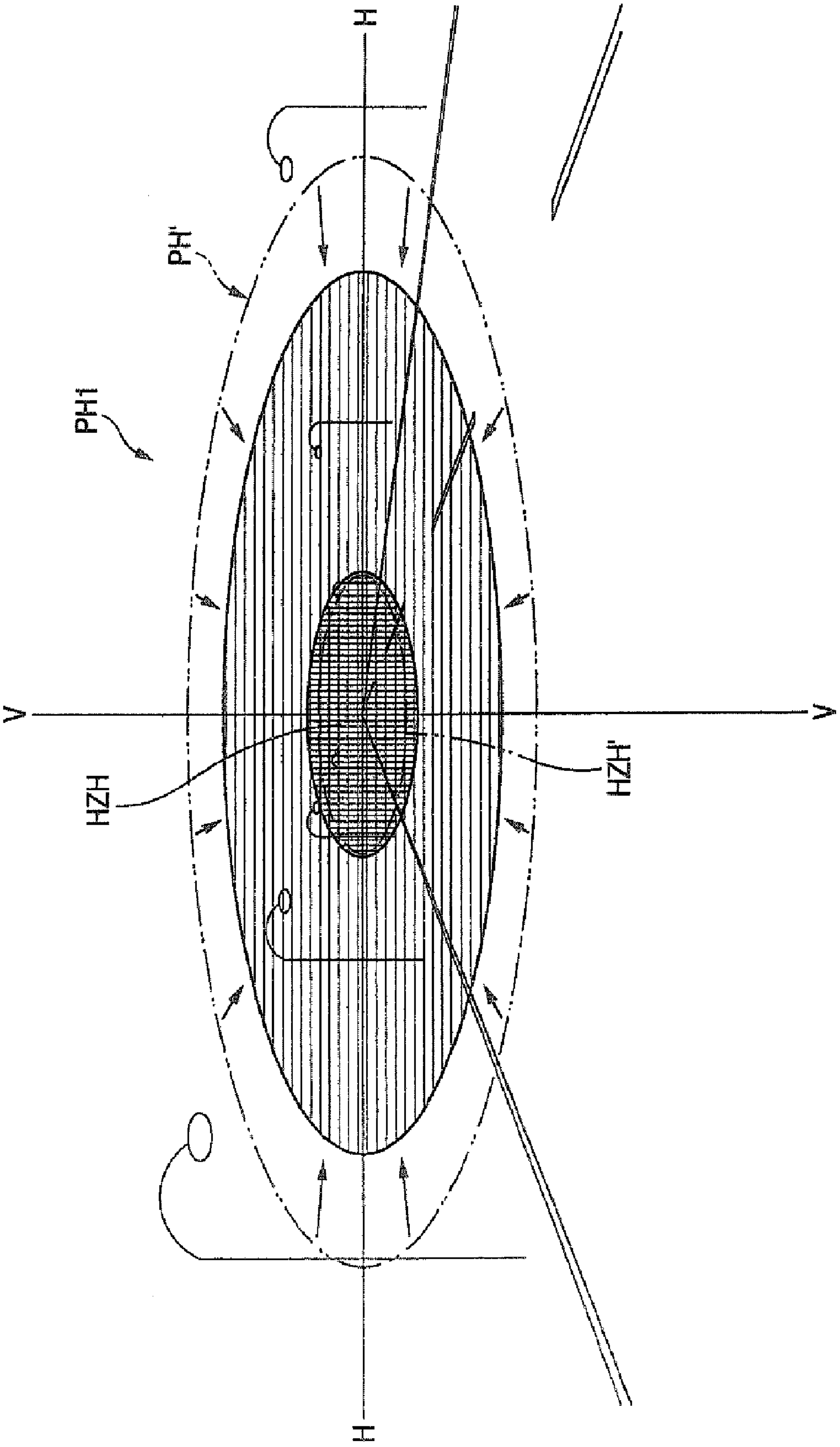
FIG. 9 is a diagram perspectively showing a high beam distribution light pattern formed on the phantom vertical screen by the light irradiated in the forward direction from the vehicle headlamp according to the second exemplary embodiment.

FIG. 9 is a diagram showing a perspective view of a high beam distribution light pattern PH1 formed by the light irradiated in the forward direction from the vehicle headlamp 110 according to the exemplary embodiment, on a phantom vertical screen disposed at a position 25 m forward from the lamp.

The high beam distribution light pattern PH1 is formed as a wide distribution light pattern expanding in the left and right directions around a cross point of H-V, and a region near the point H-V is configured as a hot zone HZH.

In FIG. 9, a distribution light pattern PH' shown by a two-dot chain line is a high beam distribution light pattern which is formed if the auxiliary lens 122 is not disposed.

In this exemplary embodiment, since the annular auxiliary lens 122 is disposed near the front side of the peripheral portion of the projection lens 16, the light that would be directed to the peripheral region of the high beam distribution light pattern PH' is deflected toward the optical axis Ax due to the lens function of the auxiliary lens. Thus, the high beam distribution light pattern PH1 is a distribution light pattern which is obtained by slightly miniaturizing the high beam distribution light pattern PH' entirely and the hot tone HZH thereof is slightly larger and more bright than the hot zone HZH' of the high beam distribution light pattern PH'. As a result, a diffusion angle required for the high beam distribution light pattern is ensured, and the center luminance of the pattern is increased to improve the visibility at a distant place on the road surface ahead of the vehicle.

In this case, since an amount of the light deflection toward the optical axis Ax by the auxiliary lens 122 becomes smaller gradually as the light incident position to the auxiliary lens 122 is away from the optical axis Ax. Thus, the high beam distribution light pattern PH1 is a distribution light pattern which is obtained by compressing the peripheral portion of the high beam distribution light pattern PH'. Therefore, the light distribution is very uniform.

Also in the case of employing the configuration of this exemplary embodiment, like the first exemplary embodiment, in the projector-type vehicle headlamp 110, the shape and the luminance distribution of the high beam distribution light pattern PH1 formed by the irradiation light can be adjusted while suppressing the generation of nonuniformity of the light distribution to the minimum. Further, this adjustment can be realized without complicating the configuration of the lamp.

Next, the third exemplary embodiment of the invention will be explained.

Figure 10:
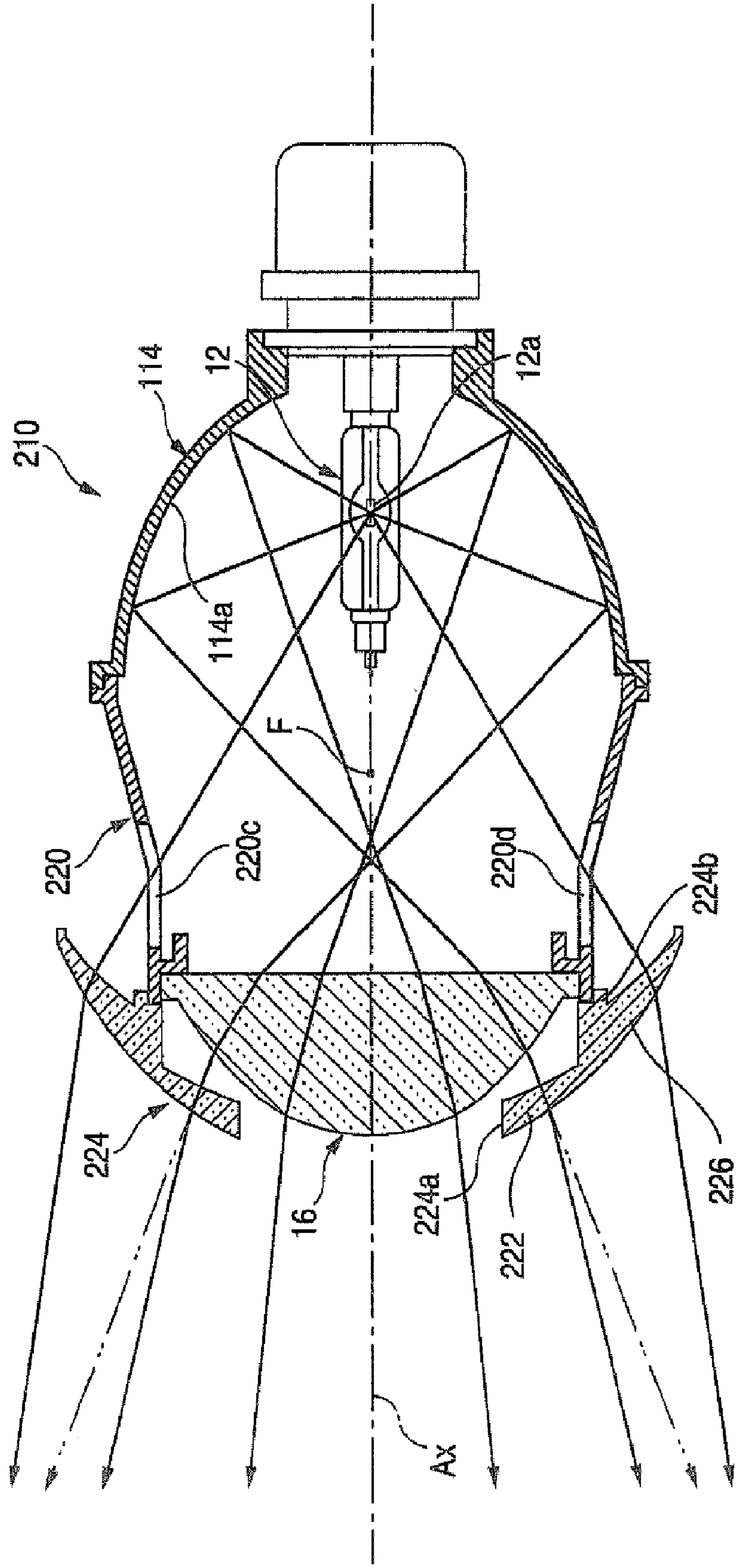
FIG. 10 is a plan sectional view showing the vehicle headlamp according to the third exemplary embodiment.

FIG. 10 is a plan sectional view showing a vehicle headlamp 210 according to this exemplary embodiment.

As shown in this figure, the vehicle headlamp 210 is same in its basic configuration as that of the second embodiment but the configurations of a holder 220 and a transparent member 224 differ from those of the second embodiment.

That is, the holder 220 according to this exemplary embodiment has almost the same configuration as that of the holder 120 of the second exemplary embodiment, but differs therefrom in that opening portions 220*c*, 220*d* are formed at the portions on the left and right sides with respect to the optical axis Ax thereof.

The transparent member 224 according to this exemplary embodiment is same in the configuration of a flange portion 224*b* and an auxiliary lens 222 thereof and the shape of an opening portion 224*a* thereof as those of the second exemplary embodiment, but the configuration of the portion on the outer peripheral side of the flange portion 224*b* differs from that of the transparent member 124.

That is, in the transparent member 124 of the second exemplary embodiment, the portion on the outer peripheral side of the flange portion 124*b* is configured as the dummy lens portion 124*c*, whilst in the transparent member 224 of this exemplary embodiment, the portion on the outer peripheral side of the flange portion 224*b* is configured as a second auxiliary lens 226.

The second auxiliary lens 226 is configured as a convex meniscus lens having a thickness that is reduced as the lens extends away from the optical axis Ax. Thereby, light, which is emitted directly from the light source 12*a* to spaces outside a periphery of the left and right sides of the projection lens 16 through the opening portions 220*c*, 220*d*, is deflected toward the optical axis Ax.

Figure 11:
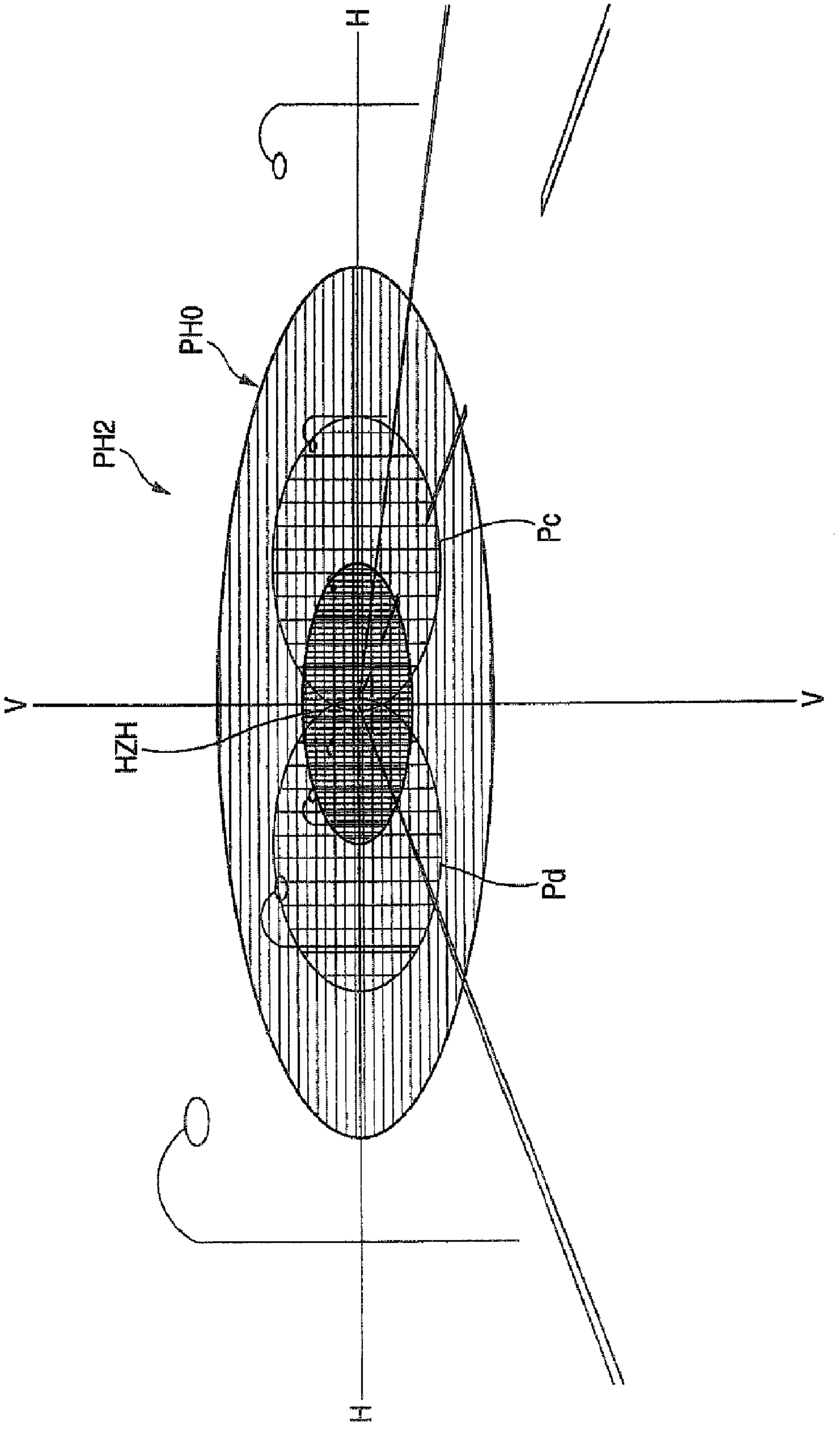
FIG. 11 is a diagram perspectively showing a high beam distribution light pattern formed on the phantom vertical screen by the light irradiated in the forward direction from the vehicle headlamp according to the third exemplary embodiment.

FIG. 11 is a diagram showing a perspective view of a high beam distribution light pattern PH2 formed by the light irradiated in the forward direction from the vehicle headlamp 210 according to the exemplary embodiment, on a phantom vertical screen disposed 25 m forward from the lamp.

The high beam distribution light pattern PH2 is formed as a composite distribution light pattern of a basic distribution light pattern PH0 and a pair of auxiliary distribution light patterns Pc, Pd.

The basic distribution light pattern PH0 is merely the same distribution light pattern as the high beam distribution light pattern PH1 of the second exemplary embodiment. This basic distribution light pattern is formed as a wide distribution light pattern expanding in the left and right directions around a cross point of H-V, and a region near the point H-V is configured as a hot zone HZH.

On the other hand, the right side auxiliary distribution light pattern Pc is a distribution light pattern which is formed by the light that is incident onto the second auxiliary lens 226 through the right side opening portion 220*c* from the light source 12*a* and irradiated in the forward direction through the second auxiliary lens 226. This right side auxiliary distribution light pattern is a distribution light pattern which spreads dimly on the right side of the hot zone HZH.

The left side auxiliary distribution light pattern Pd is a distribution light pattern which is formed by the light that is incident onto the second auxiliary lens 226 through the left side opening portion 220*d* from the light source 12*a* and irradiated in the forward direction through the second auxiliary lens 226. This left side auxiliary distribution light pattern is a distribution light pattern which spreads dimly on the left side of the hot zone HZH.

By employing the configuration of this exemplary embodiment, the high beam distribution light pattern PH2 can be obtained, by effectively utilizing the light from the light source 12*a*, in which the brightness is larger than that of the high beam distribution light pattern PH1 of the second exemplary embodiment.

Each of the pair of the auxiliary distribution light patterns Pc, Pd is a dim distribution light pattern in which luminance reduces gradually from the center portion thereof toward the outer peripheral edge. Thus, when these auxiliary distribution light patterns Pc, Pd are added to the basic distribution light pattern PH0, the high beam distribution light pattern PH2 is uniform.

Next, the fourth exemplary embodiment of the invention will be explained.

Figure 12:
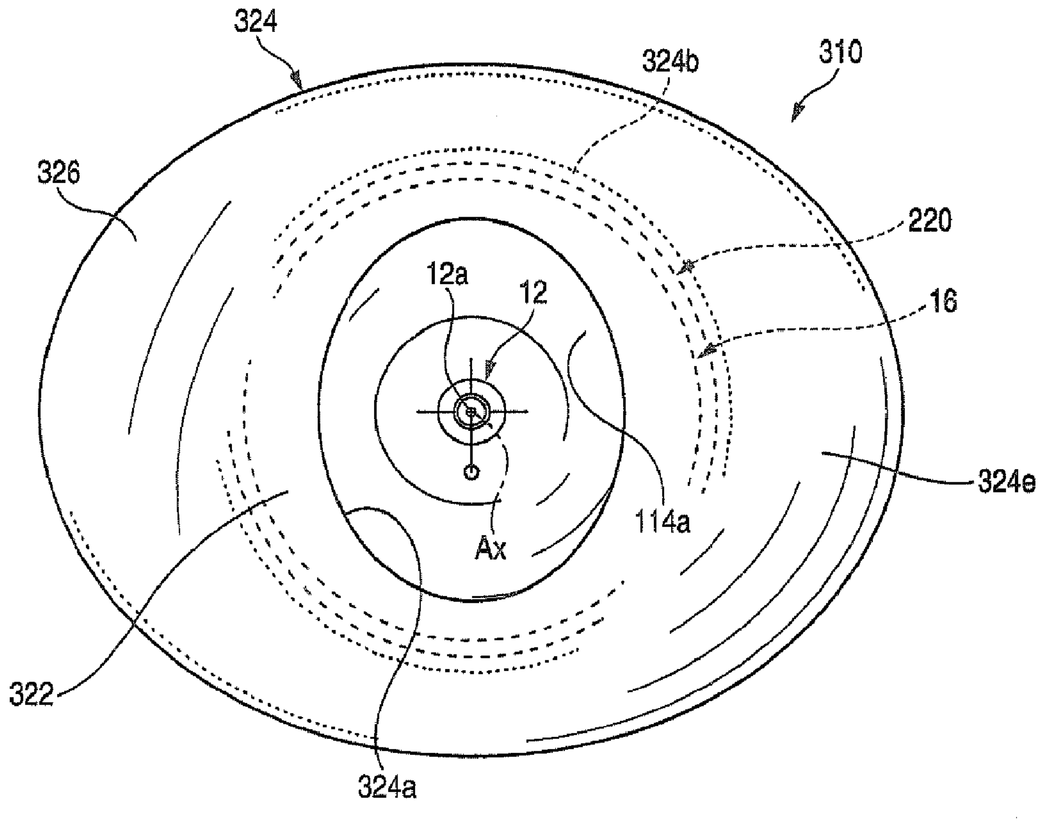
FIG. 12 is a front view showing a vehicle headlamp according to the fourth exemplary embodiment of the invention.
Figure 13:
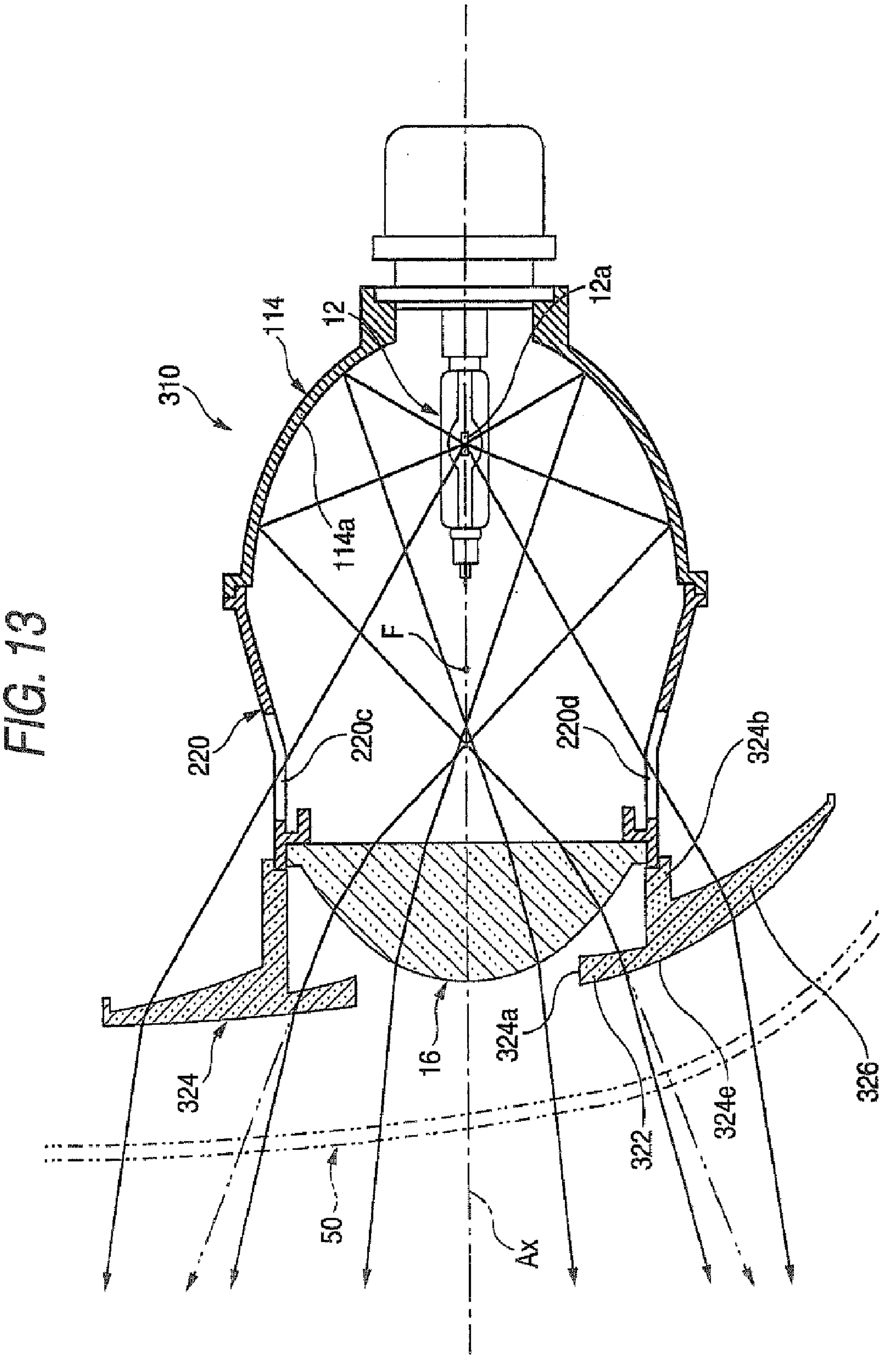
FIG. 13 is a plan sectional view showing the vehicle headlamp according to the fourth exemplary embodiment of the invention.

FIG. 12 is a front view showing a vehicle headlamp 310 according to this exemplary embodiment and FIG. 13 is a plan sectional view thereof.

As shown in these drawings, the vehicle headlamp 310 is same in its basic configuration as that of the third exemplary embodiment, but the configuration of a transparent member 324 differs from that of the third exemplary embodiment.

That is, the transparent member 324 according to this exemplary embodiment has the shape of an opening portion 324*a*, the configuration of a flange portion 324*b* and the optical functions of an auxiliary lens 322 and a second auxiliary lens 326 that are the same as those of the transparent member 224 of the third exemplary embodiment. However, the transparent member according to the exemplary embodiment differs from the transparent member 224 of the third exemplary embodiment in that the front face 324*a* thereof has a surface shape that is asymmetrical in the left and right direction with respect to the vertical plane including the optical axis Ax.

The vehicle headlamp 310 according to this exemplary embodiment is a vehicle headlamp disposed at the left-side front end portion of the vehicle, and a translucent cover 50 is disposed at the forward portion thereof. This translucent cover is formed so as to extend to the rear side of the vehicle from the inner side in the vehicle width direction toward the outside. The transparent member 324 of the vehicle headlamp 310 has an outer configuration of a wide elliptical shape when viewed from the front side of the lamp, and the front face 324*e* thereof is formed so as to extend to the rear side of the vehicle along the translucent cover 50 from the inner side in the vehicle width direction toward the outside.

When employing the configuration of this exemplary embodiment, function and effects that are the same as those of the third exemplary embodiment also can be attained.

Further, by employing the configuration of this exemplary embodiment, the design of the vehicle headlamp 310 can be easily matched with the vehicle configuration. When a transparent member having the configuration symmetrical in the left and right direction with respect to the transparent member 324 of the vehicle headlamp 310 according to this exemplary embodiment is used for the vehicle headlamp disposed at the right-side front end portion of the vehicle, function and effects that are the same as those of this exemplary embodiment can be obtained.

Next, the fifth exemplary embodiment of the invention will be explained.

Figure 14:
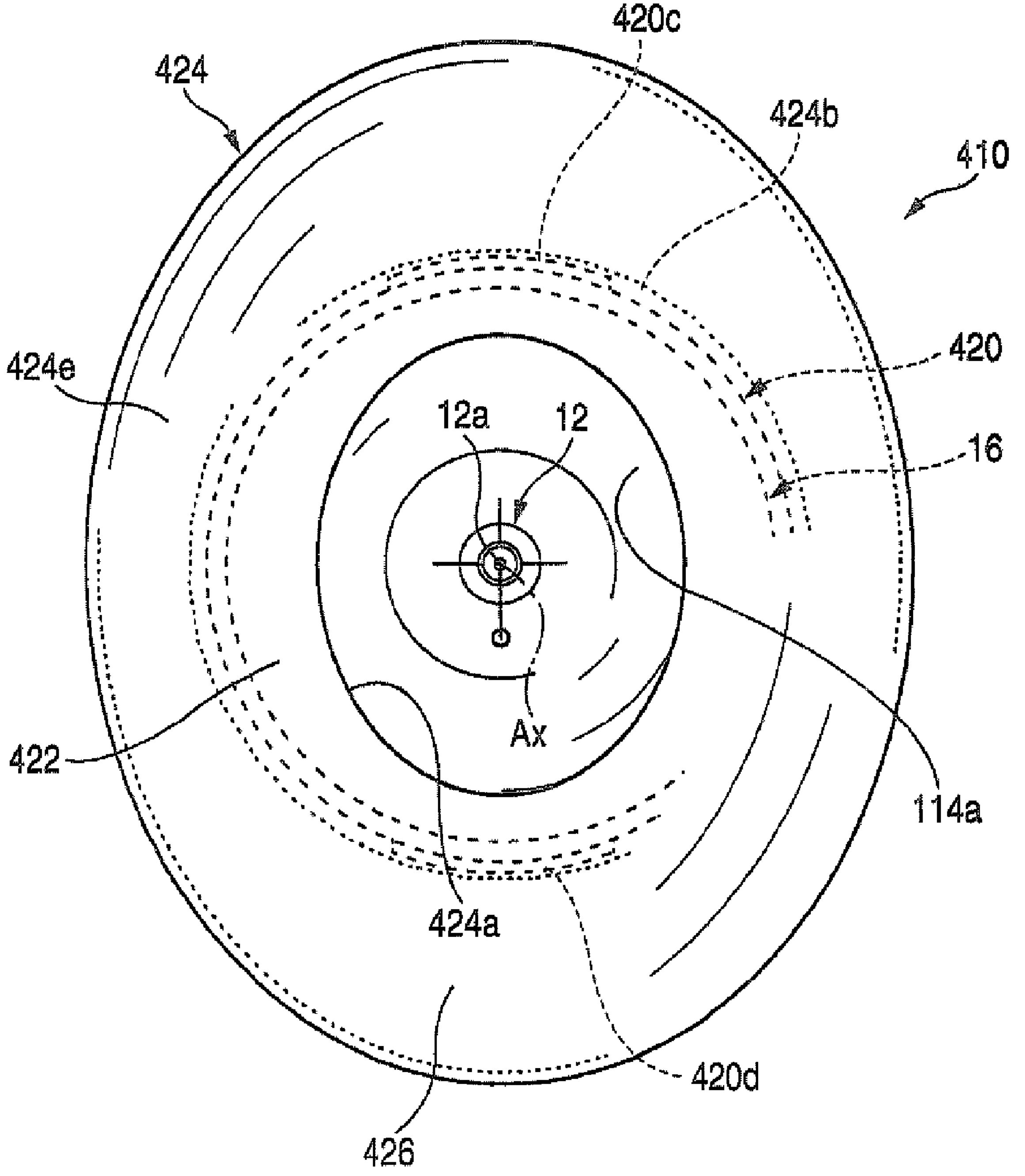
FIG. 14 is a front view showing a vehicle headlamp according to the fifth exemplary embodiment of the invention.

FIG. 14 is a plan view showing a vehicle headlamp 410 according to this exemplary embodiment.

As shown in this figure, the vehicle headlamp 410 is same in its basic configuration as that of the fourth embodiment, but the configuration of a holder 420 and a transparent member 424 differ from those of the fourth exemplary embodiment.

That is, the transparent member 424 according to this exemplary embodiment has the shape of an opening portion 424*a*, the configuration of a flange portion 424*b* and the optical functions of an auxiliary lens 422 and a second auxiliary lens 326 that are the same as those of the transparent member 324 of the fourth exemplary embodiment. However, the transparent member 424 has an outer configuration of an elliptical shape elongated in the vertical direction when viewed from the front side of the lamp. The front face 424*e* of the transparent member 424 is formed so as to extend to the rear side of the vehicle from the lower end portion thereof toward the upper end portion thereof and has a surface shape that is asymmetrical in the vertical direction with respect to the horizontal plane including the optical axis Ax.

In the vehicle headlamp 410 according to this exemplary embodiment, even in the case where a translucent cover is formed so as to extend to the rear side of the vehicle from the lower end portion thereof toward the upper end portion thereof, the transparent member 424 can be disposed along the translucent cover.

Further, in the vehicle headlamp 410 according to this exemplary embodiment, a pair of opening portions 420*c*, 420*d* are formed at the upper and lower ends of the holder 420, respectively, and the direct lights emitted from the light source 12*a* toward the outer peripheral spaces of the projection lens 16 through the opening portions 420*c*, 420*d* are deflected toward the optical axis Ax by a second auxiliary lens 426. Thus, also in this exemplary embodiment, the brightness of the high beam distribution light pattern can be increased by effectively utilizing the light from the light source 12*a*.

While the invention has been described in connection with the exemplary embodiments thereof, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A vehicle headlamp comprising:

a projection lens disposed on an optical axis extending in a longitudinal direction of the vehicle;

a light source disposed at a rear side of a rear side focal point of the projection lens;

a reflector which reflects a light emitted from the light source to a front direction and toward the optical axis; and an auxiliary lens disposed in front of a peripheral portion of the projection lens, said auxiliary lens covering only said peripheral portion of the projection lens;

wherein the auxiliary lens controls a deflection of a light reflected from the reflector and transmitted through only said peripheral portion of the projection lens the projection lens; and wherein the auxiliary lens is disposed on at least one of a left side or a right side of the optical axis and is configured to deflect the light reflected from the reflector and transmitted through the projection lens in a horizontal direction.

2. The vehicle headlamp according to claim 1, wherein the auxiliary lens has an annular shape and is formed such that a thickness thereof reduces in accordance with a distance away from the optical axis.

3. A vehicle headlamp comprising:

a projection lens disposed on an optical axis extending in a longitudinal direction of the vehicle;

a light source disposed at a rear side of a rear side focal point of the projection lens;

a reflector which reflects a light emitted from the light source to a front direction and toward the optical axis; and an auxiliary lens disposed in front of a peripheral portion of the projection lens, said auxiliary lens covering only said peripheral portion of the projection lens;

wherein the auxiliary lens controls a deflection of a light reflected from the reflector and transmitted through only said peripheral portion of the projection lens the projection lens; and wherein the auxiliary lens is formed such that a thickness thereof increases in accordance with a distance away from the optical axis.

4. A vehicle headlamp comprising:

a projection lens disposed on an optical axis extending in a longitudinal direction of the vehicle;

a light source disposed at a rear side of a rear side focal point of the projection lens;

a reflector which reflects a light emitted from the light source to a front direction toward the optical axis, and a transparent member having an opening portion formed in a region near to the optical axis, comprising:

an auxiliary lens disposed in front of a peripheral portion of the projection lens, wherein the auxiliary lens said auxiliary lens covering only said peripheral portion of the projection lens; controls a deflection of a light reflected from the reflector and transmitted through only said peripheral portion of the projection lens the projection lens; and wherein the auxiliary lens is disposed on at least one of a left side or a right side of the optical axis and is configured to deflect the light reflected from the reflector and transmitted through the projection lens in a horizontal direction.

5. The vehicle headlamp according to claim 4, wherein the auxiliary lens is formed such that a thickness thereof increases in accordance with a distance away from the optical axis.

6. The vehicle headlamp according to claim 4, wherein the auxiliary lens has an annular shape and is formed such that a thickness thereof reduces in accordance with a distance away from the optical axis.

7. The vehicle headlamp according to claim 4, wherein a front face of the transparent member has a surface shape that is asymmetrical with respect to a predetermined plane including the optical axis.

8. The vehicle headlamp according to claim 7, wherein the predetermined plane is a vertical plane including the optical axis.

9. The vehicle headlamp according to claim 7, wherein the predetermined plane is a horizontal plane including the optical axis.

10. The vehicle headlamp according to claim 4, wherein the transparent member is formed so as to surround the projection lens, and further comprises:

a second auxiliary lens formed on an outer peripheral side of the projection lens, wherein the second auxiliary lens deflects a light, directly emitted from the light source toward a space outside of a periphery of the projection lens, toward the optical axis.

11. The vehicle headlamp according to claim 10, wherein a front face of the transparent member has a surface shape that is asymmetrical with respect to a predetermined plane including the optical axis.

12. The vehicle headlamp according to claim 11, wherein the predetermined plane is a vertical plane including the optical axis.

13. The vehicle headlamp according to claim 11, wherein the predetermined plane is a horizontal plane including the optical axis.

* * * * *